(12) United States Patent
Ritter et al.

(10) Patent No.: US 9,072,221 B2
(45) Date of Patent: Jul. 7, 2015

(54) SECTIONAL DRIVESHAFT ARRANGEMENT FOR A CORN HEAD

(71) Applicant: Deere & Company, Moline, IL (US)

(72) Inventors: Aaron S. Ritter, Milan, IL (US); Matthew R. White, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 45 days.

(21) Appl. No.: 13/848,397

(22) Filed: Mar. 21, 2013

(65) Prior Publication Data

US 2014/0283490 A1    Sep. 25, 2014

(51) Int. Cl.
*A01D 45/02*   (2006.01)
*A01D 69/06*   (2006.01)

(52) U.S. Cl.
CPC .............. *A01D 45/021* (2013.01); *A01D 69/06* (2013.01)

(58) Field of Classification Search
CPC . A01D 43/082; A01D 43/215; A01D 45/021; A01D 69/00; A01D 69/06; A01D 69/08

USPC ............ 56/10.1, 10.2, 10.8, 11.2, 11.3, 10.3, 56/13.6, 16.4 R, 64, 11.4, 11.5, 11.7, 13.5, 56/13.8; 192/113.1, 113.31; 464/17, 464/42–48

See application file for complete search history.

(56) References Cited

U.S. PATENT DOCUMENTS

| 6,349,258 B1 | 2/2002 | Bonhoure et al. |
| 6,902,485 B2 * | 6/2005 | Wubbels .......................... 464/17 |
| 7,640,718 B2 | 1/2010 | Altepost et al. |

FOREIGN PATENT DOCUMENTS

| DE | 10316003 A1 | 7/2005 |
| EP | 0775437 B2 | 5/1997 |
| EP | 1820387 A1 | 8/2007 |

\* cited by examiner

*Primary Examiner* — Robert Pezzuto

(57) ABSTRACT

A sectional driveshaft arrangement of a corn head comprises a first row unit that is driven by a first driveshaft. The first row unit in turn drives a second driveshaft that drives a second row unit.

16 Claims, 5 Drawing Sheets

SECTIONAL DRIVESHAFT ARRANGEMENT FOR A CORN HEAD

FIELD OF THE INVENTION

The present invention relates generally to agricultural harvesters. More particularly it relates to harvesting heads. Even more particularly it relates to driveshaft arrangements for driving row units of a corn head.

BACKGROUND OF THE INVENTION

Corn heads are agricultural implements configured to be supported on the front of a combine harvester. The corn head is typically arranged as a laterally extending transverse frame on which several row units are fixed. The row units are spaced equidistantly across the leading edge of the corn head frame.

Row units are driven by one or more driveshafts that extend in a transverse direction parallel to the transverse extent of the corn head frame.

In one common arrangement, shown in EP 1,820 387 A1, all of the row units on at least one side of the corn head are driven by a common polygonal driveshaft. that can be 15-20 feet long and pass through 6-8 separate row units.

In order to repair the row units, this driveshaft must be removed. The removal process typically requires a farmer to support the corn head on agricultural harvester, unbolt a cover at the outer end of the corn head, attach a chain to the end of the corn head driveshaft, attach the other end of the chain to a tow vehicle, such as a tractor or truck, and then remove the 15-20 foot long corn head driveshaft by pulling it out of its 6-8 row units with the tow vehicle.

This process takes an extended period of time, and typically two or more people to perform. The replacement process is even more time-consuming, since the long driveshaft must be inserted into the corn head and threaded through the 6-8 row units one at a time.

Another arrangement, shown in EP 0 775 437 B2 is for a forage harvester. There are several gearboxes that drive rotating knives and conveyors. The gearboxes have internal driveshafts that are splined at each end and extend outward from either side of the gearbox. Another arrangement, shown in U.S. Pat. No. 7,640,718 B2 shows several gearboxes for a forage harvester that have short drive shafts extending through the gearboxes and stub axles with universal joints that connect the driveshafts that extend from each gearbox. Another arrangement, shown in DE 103 16 003 A1 shows a parallel drive arrangement for driving row units on corn heads. Another arrangement, shown in U.S. Pat. No. 6,349, 258 B1 illustrate a drive arrangement for driving transversely adjustable row units.

What is needed, therefore, is an improved driveshaft arrangement for a corn head that permits individual row units to be removed and replaced more quickly and easily.

SUMMARY OF THE INVENTION

It is therefore an object of the present invention to provide an improved driveshaft arrangement for a corn head.

In accordance with one aspect of the invention, a sectional driveshaft arrangement for a corn head is provided, comprising: a first row unit comprising a first gearbox and a first slip clutch drivingly coupled to the first gearbox; a first driveshaft, the first driveshaft having a first end and a second end opposite the first end, wherein the first end terminates within the first slip clutch; and a second driveshaft, the second driveshaft having a third end and a fourth end opposite to the third end, wherein the third end terminates within the first slip clutch; wherein the first slip clutch is configured to be driven in rotation by the first driveshaft and to drive the second driveshaft in rotation.

The sectional driveshaft arrangement for a corn head may further comprise a second row unit adjacent to the first row unit, the second row unit may comprise a second gearbox and a second slip clutch, and the fourth end of the second driveshaft may terminate within the second slip clutch, and the second slip clutch may be configured to be driven in rotation by the second driveshaft.

The sectional driveshaft arrangement for a corn head may further comprise a third driveshaft, the third driveshaft may have a fifth end and a sixth end opposite the fifth end; and the fifth end may terminate in the second slip clutch and the second slip clutch may drive the third driveshaft in rotation.

The sectional driveshaft arrangement for a corn head may further comprise a third row unit that is adjacent to the second row unit, and the third row unit may comprise a third gearbox and a third slip clutch, and the sixth end may terminate in the third slip clutch, and the third slip clutch may be configured to be driven in rotation by the third driveshaft.

The first slip clutch may comprise an inner sleeve that receives and supports the first end and the third end, and the inner sleeve may be configured to transmit power from the first end to the third end.

The inner sleeve may have a through hole with an inner surface that, in axial cross-section, defines a first polygon, and the first end and the third end may have outer surfaces that, in axial cross-section, define a second polygon, such that the second polygon may be contained within boundaries of the first polygon, and such that the second polygon is not capable of being rotated with respect to the first polygon while staying contained within boundaries of the first polygon.

The first end may be configured to be received in a first side of the inner sleeve and to axially translate through the inner sleeve until the first end passes entirely through the inner sleeve and extends at least partially out a second side of the inner sleeve.

The third end may be configured to be received in the second side of the inner sleeve and axially translate with respect to the inner sleeve until the third end passes entirely through the inner sleeve and extends at least partially out the first side of the inner sleeve.

The first slip clutch may have an abutment that is disposed to prevent the first end or the third end from passing completely through the first slip clutch.

The first slip clutch may define a first aperture extending into the first slip clutch from one side of the first slip clutch, and wherein the first slip clutch may define a second aperture extending into the first slip clutch from a side of the first slip clutch that is opposite the one side, and wherein the first end is configured to be inserted into the first aperture, and the second end is configured to be inserted into the second aperture.

The first end has a first rotational axis and the second end has a second rotational axis, and further wherein the first rotational axis and the second rotational axis are coaxial.

These and other objects, features and advantages of the invention will become apparent to one skilled in the art upon reading the following description in view of the drawings.

DESCRIPTION OF THE PREFERRED EMBODIMENT

Figure 1:
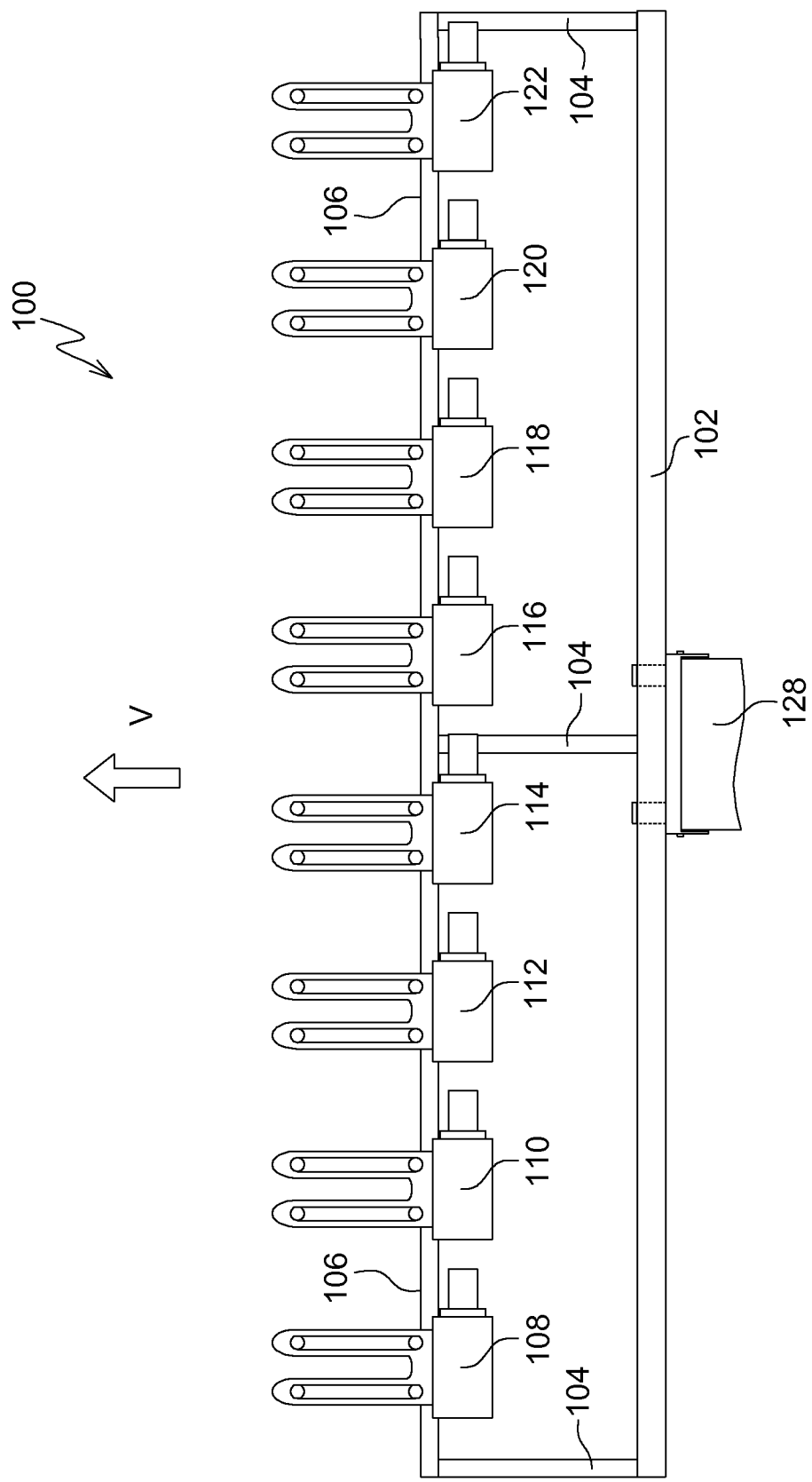
FIG. 1 is a schematic plan view of a corn head in accordance with the present invention.

Referring now to FIG. 1, a corn head 100 comprises a frame 102, toolbar supports 104, toolbar 106, row unit 108, row unit 110, row unit 112, row unit 114, row unit 116, row unit 118, row unit 120, and row unit 122.

Frame 102 is elongate member extending laterally, and generally perpendicular to the direction of travel "V" of the corn head 100. Frame 102 (and hence the corn head 100) is supported on a feederhouse 128 that extends forward from the front end of a combine harvester (not shown).

Toolbar supports 104 are fixed to frame 102 and extend forward therefrom.

Toolbar 106 extends laterally and parallel to frame 102. Toolbar 106 extends substantially the entire width of the corn head.

Row unit 108, row unit 110, row unit 112, row unit 114, row unit 116, row unit 118, row unit 120, and row unit 122 are fixed to the toolbar 106 and extend forward therefrom. The row units are identically constructed. The row units are mounted on the toolbar a constant spacing apart of 20-36 inches.

The corn head 100 is supported on the feederhouse 128 to be carried through the agricultural field harvesting crop in the direction "V". The row units are driven elements, supplied with power from the combine harvester (not shown) through an arrangement of belts, shafts, pulleys, and hydraulics.

In a conventional corn head, a single driveshaft extends inwardly from the left end of the corn head to the center of the corn head. This driveshaft drives all of the row units on the left side of the corn head. In a similar fashion, a single driveshaft extends inwardly from the right end of the corn head to the center of the corn head. This driveshaft drives all of the row units on the right side of the corn head.

Figure 2:
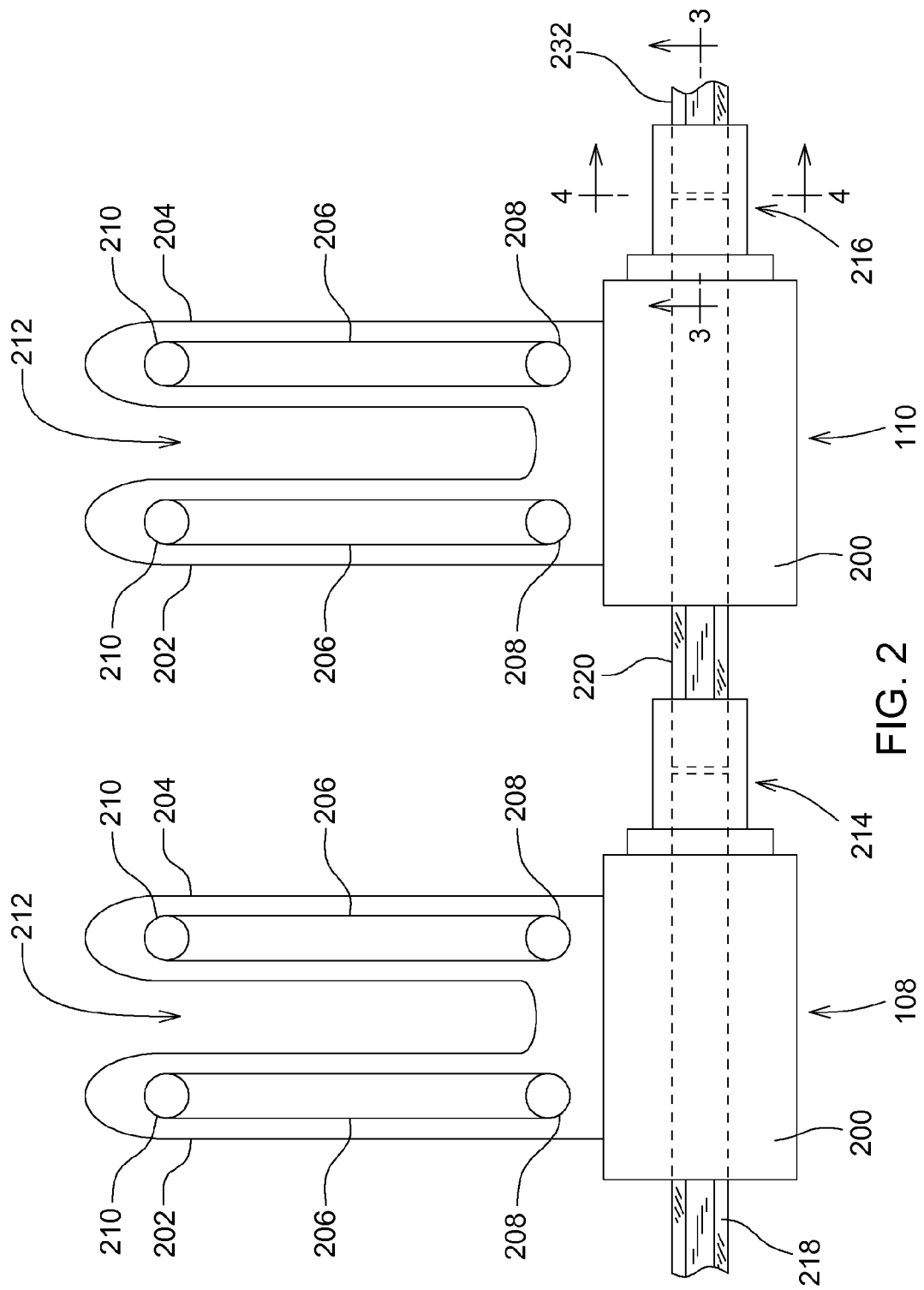
FIG. 2 is a detailed view of two adjacent row units of the corn head of FIG. 1.

The arrangement of the present invention is shown in greater detail in FIG. 2. In FIG. 2, two adjacent row units 108, 110 are shown as examples of the drive arrangement of the corn head 100.

The drive arrangement between row unit 108 and row unit 110 is the same as the drive arrangement between row unit 110 and row unit 112, and between row unit 112 and row unit 114 on the left side of the corn head 100. All of the row units are connected, collectively, with two or more driveshafts, wherein each driveshaft is coaxial with all the other driveshafts.

The drive arrangement between row unit 108 and row unit 110 is also the same as the drive arrangement between row unit 116 and row unit 118, between row unit 118 and row unit 120, and between row unit 120 and row unit 122. On the right side of the corn head 100.

In short, every pair of adjacent row units (except the two middle row units: row unit 114 and row unit 116) are coupled together using the drive arrangement shown in FIG. 2.

The two endmost row units (row unit 108 and row unit 122) are driven by a driveshaft that is coupled to a remote source of power. This remote source of power is the engine provided in the combine harvester (not shown).

A typical arrangement for supplying power to the endmost row units can be found in EP 1,820,387 A1 which is incorporated herein by reference for all that it teaches.

In FIG. 2, each row unit comprises a gearbox 200, two arms 202, 204, two gathering chains 206, two drive sprockets 208, two idler sprockets 210 and a slip clutch.

The two arms 202, 204 are fixed to the gearbox 200 and extend forwardly therefrom. Each of the arms 202, 204 supports a gathering chain 206 that is formed in an endless loop and is supported on and driven by a drive sprocket 208 at the rear of each gathering chain 206. An idler sprocket 210 is disposed at the forward end of each of the arms 202, 204, about which the gathering chain 206 wraps.

A gap 212, open at a forward-facing end, is elongate an extends parallel to the direction of travel "V", and is provided between the two arms 202, 204. As the corn head 100 is driven over the field, the operator aligns the corn head such that a row of crops passes into the gap 212. The gathering chains 206 are driven by the gearbox 200 such that they pull the stalk of each plant in the row of crops rearward. Two stalk rolls (not shown) extend forward from the gearbox 200 underneath the two forwardly extending arms 202, 204. The stalk rolls pull the stalk of each plant downward Two deck plates (not shown) which are disposed on the top surfaces of the two forwardly extending arms 202, 204 202 define a gap therebetween that is narrow enough to permit the stalk to pass, but not to permit ears of corn to pass. As a result, the stalk rolls pull the stalk down, and the ears of corn are stripped from the stalks. The gathering chains 206 carry the ears of corn rearward into a conveyor (not shown). The conveyor carries the ears of corn to a center portion of the corn head 100. A conveyor disposed in the feederhouse 128 carries the ears of corn rearward, through the feederhouse 128, and into the combine harvester (not shown).

The gearbox 200 of row unit 108 is fixed to and is driven by a slip clutch 214. The gearbox 200 of row unit 110 is fixed to and is driven by a slip clutch 216. The slip clutch 214 and the slip clutch 216 are identically constructed. Either slip clutch is exemplary of all the other slip clutches that are coupled to and drive the other row units. The slip clutch 214 and the slip clutch 216 are coupled together with a driveshaft 218. The driveshaft 218 terminates at its left end within the slip clutch 214 and terminates at its right end within the slip clutch 216.

Driveshaft 218 is driven at its left end by the engine of the combine harvester. Driveshaft 218 terminates inside slip clutch 214 at its right end and drives the slip clutch 214.

Driveshaft 220 is a sectional driveshaft. The left end of driveshaft 220 terminates inside slip clutch 214 and is driven by slip clutch 214. The right end of driveshaft 220 terminates inside slip clutch 216 and drives slip clutch 216. Slip clutch 214 and slip clutch 216 are adjacent.

Figure 3:
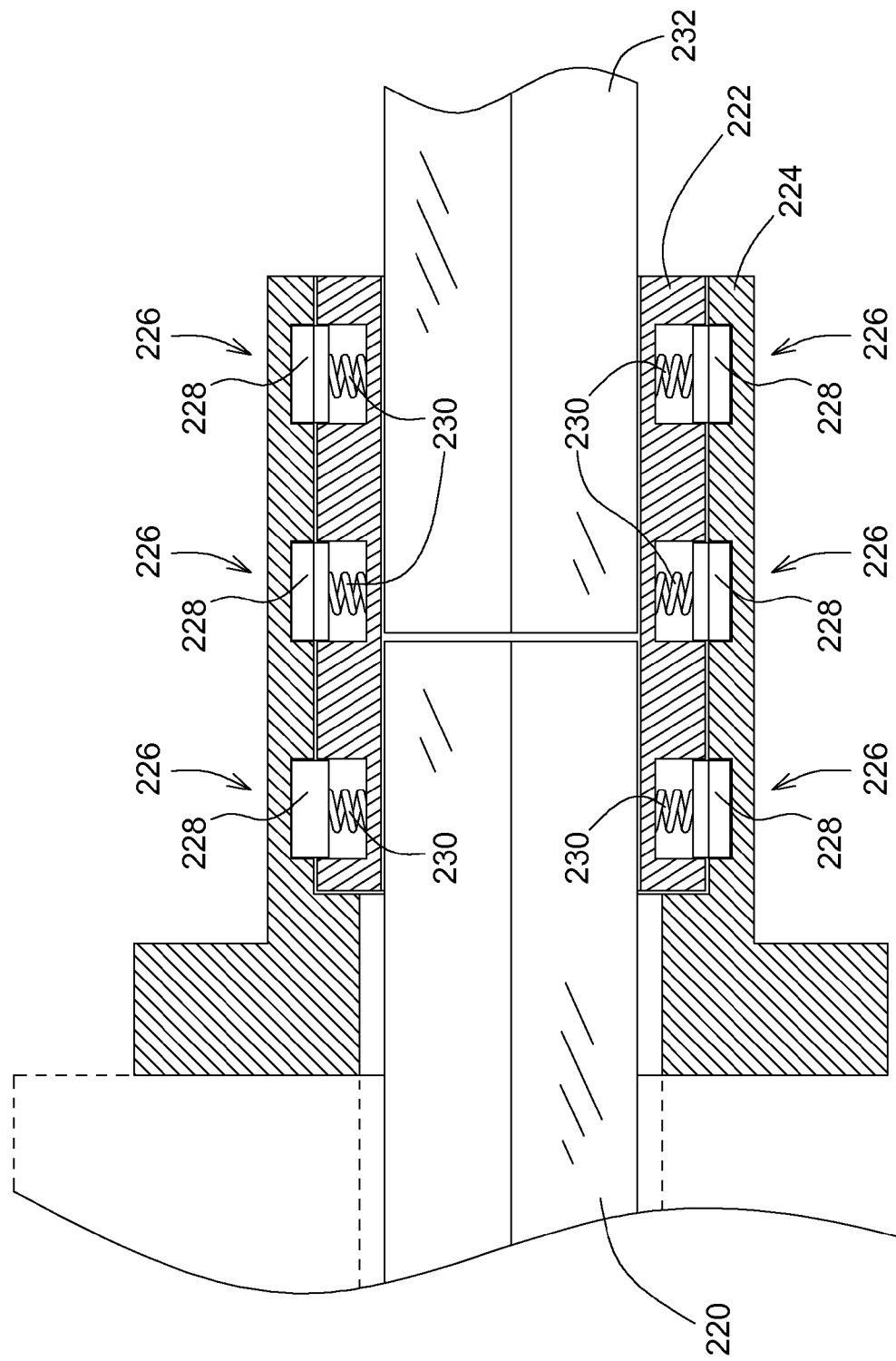
FIG. 3 is a cross-sectional view of a slip clutch of the row units of FIG. 2 taken at section line 3-3 in FIG. 2.
Figure 4:
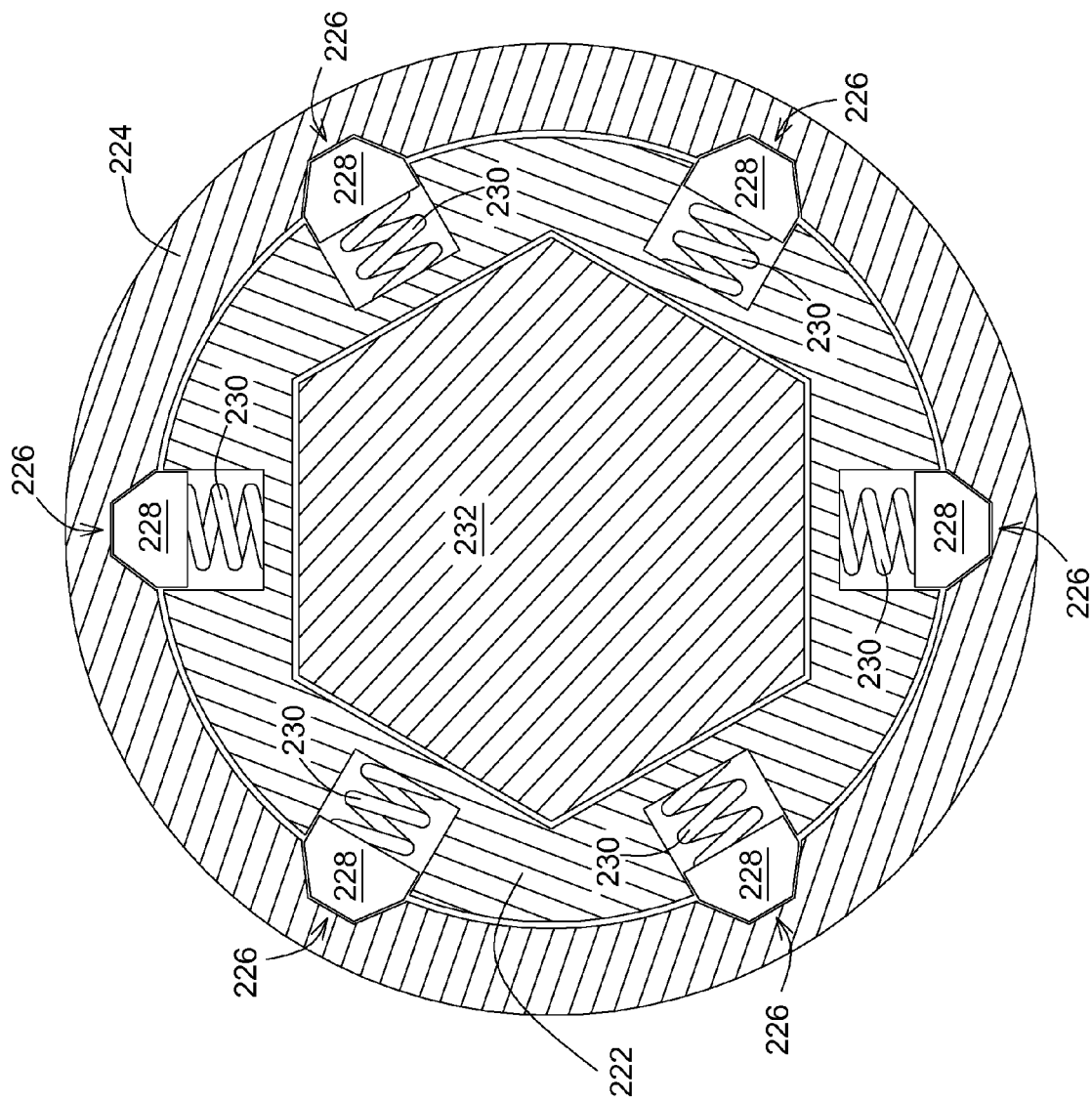
FIG. 4 is a cross-sectional view of the slip clutch of the row units of FIG. 2 taken at section line 4-4 in FIG. 2.

FIGS. 3 and 4 illustrate features of the slip clutch 214. All the slip clutches are identically constructed. Thus, all the statements herein regarding the operation of slip clutch 214 are true of all the other slip clutches of corn head 100.

The slip clutch 214 comprises an inner sleeve 222, an outer sleeve 224, and several torque transfer members 226 that extend between the inner sleeve 222 and the outer sleeve 224.

The inner sleeve 222 has the general form of a hollow cylinder. It is disposed within and concentric with the outer sleeve 224, which also has the general form of a hollow cylinder.

Torque transfer members 226 extend between and couple the inner sleeve 222 and the outer sleeve 224. A typical torque transfer member 226 includes an engagement element 228 and a spring 230. Spring 230 is disposed inside an aperture in the inner sleeve 222 and extends outwardly therefrom. Spring 230 abuts an engagement element 228 associated with the spring 230. Each spring 230 pushes its associated engagement element 228 into engagement with the outer sleeve 224.

The inner sleeve 222 and the outer sleeve 224 rotate freely with respect to each other. The torque transfer members 226 extend between them and compel the outer sleeve 224 to rotate with the inner sleeve 222 when the driveshaft 218 drives the inner sleeve 222 in rotation.

The outer sleeve 224, in turn, is drivingly connected to the connected to the two drive sprockets 208 to drive them in rotation. The outer sleeve 224, is also drivingly connected to the two stalk rolls (not shown) to drive them in rotation.

If the row unit 108 becomes jammed, it will resist the rotation of the outer sleeve 224. This, in turn, will cause an increased reactive torque to be applied by the outer sleeve 224 to the inner sleeve 222. This increased reactive torque, in turn, will force the engagement elements 228 radially inwardly toward the axis of rotation of the two sleeves, and (if the reactive torque is high enough) will permit the outer sleeve 224 to stop as the inner sleeve 222 is driven in rotation by the driveshaft 218. In this state, the slip clutch 214 is said to be "slipping".

The inner surface of the inner sleeve 222 is noncircular. In the embodiment shown here it is polygonal. It is a regular polygon. It is hexagonal. The driveshaft 218 and the driveshaft 220 have the same cross sectional profile. They are both noncircular polygons, regular polygons and hexagons.

The external surfaces of the driveshaft 218 and the driveshaft 220 match the inside surface of the inner sleeve 222. They are dimensioned such that the outer surface of the driveshaft 218 and the outer surface of the driveshaft 220 engage the inner surface of the inner sleeve 222. This surface-to-surface engagement is such that the driveshaft 218 drives the inner sleeve 222 in rotation whenever the driveshaft 218 rotates, and such that the inner sleeve 222, in turn, drives the driveshaft 220 in rotation whenever the inner sleeve 222 rotates.

The hexagon that forms the outer surface of driveshaft 218 and driveshaft 220 is received inside the boundaries of the hexagon that forms the boundaries of the inner surface of inner sleeve 222. They are very close to the same size, however, and the hexagonal outer surface of the driveshafts cannot be rotated within the hexagonal inner surface of the inner sleeve 222 because the surfaces interfere with each other. it is this interference and prevention of rotation that permits driveshaft 218 to drive the inner sleeve 222 and permits the inner sleeve 222 to rotate driveshaft 220 in turn. The apertures in inner sleeve 222 in which driveshaft 218 and driveshaft 20 are inserted have the same polygonal shape in one embodiment. Thus, driveshaft 218 and driveshaft 220 can have the same polygonal shape and therefore be fitted interchangeably in either aperture.

A sliding clearance may be provided between the outer surfaces of the driveshaft 218 and the driveshaft 220 and the inner surface of the inner sleeve 222 to permit the driveshaft 218 and the driveshaft 220 to be translated axially, by hand, to the left or to the right with respect to the inner sleeve 222 and thereby to permit the driveshaft 218 in the driveshaft 220 to be removed by hand from the slip clutch 214 and therefore also be removed from the row unit 108.

As shown herein, all of the drive shafts that couple the row units are coaxial. Furthermore they all rotate around a common axis of rotation. Furthermore, the apertures that pass into each side of the inner sleeves 222 and support driveshafts are all coaxial with each other, and with all of the drive shafts. Furthermore, the apertures that pass into each side of the inner sleeves 222 and support driveshafts all rotate about a common rotational axis.

Power is transmitted from the driveshaft 218 driven by the engine of the combine harvester to the inner sleeve 222 of the slip clutch 214. The inner sleeve of the slip clutch 214, in turn, drives the outer sleeve 224 of the slip clutch 214 and also drives the driveshaft 220. The outer sleeve 224 of the slip clutch 214, in turn, drives the driven elements (the gathering chains 206) of the row unit 108. The driveshaft 220, in turn, drives the inner sleeve of the slip clutch associated with the row unit 110. The inner sleeve of the slip clutch associated with row unit 110, in turn, drives the driven elements (the gathering chains 206) of the row unit 110. The inner sleeve of the slip clutch associated with row unit 110, also drives the sectional driveshaft 232 (shown cut away in FIGS. 2 and 3), which is in turn connected to the next row unit (row unit 112) in the same manner. A similar sectional driveshaft is provided between the row unit 112 and the row unit 114 that is identical to the driveshaft 220 and functions in the identical manner.

The discussion in the previous paragraphs have addressed the drive arrangement of the row units on the left side of the corn head 100. The drive arrangement of the row units on the right side of the corn head 100 is identical, but in mirror image form. The outermost row unit on the right hand side (i.e. row unit 222) is driven at its right side by a driveshaft that is identical to the driveshaft 118 and is identically connected to and driven by the engine of the combine harvester.

One advantage to the foregoing arrangement is the fact that long row unit driveshafts need not be stocked or shipped. Each row unit driveshaft need only be as long as the standard row unit spacing of the row units, which typically varies between 20 and 36 inches in length.

Another advantage to the foregoing arrangement is the elimination of driveshaft couplers. In some previous row unit drive arrangements, an extremely long row unit driveshaft is manufactured and shipped in two (or more) sections, depending upon the overall length of the driveshaft. Each section of the two (or more) sections would be inserted through the slip clutches of the row units until the two sections of driveshaft abutted each other between two adjacent row units. At this point, a driveshaft coupler (in the form of a multi-piece collar) is placed around the abutting ends of the driveshaft and the coupler is firmly attached to both driveshaft sections. By providing sectional drive shafts that extend between and terminate at the slip clutches of each adjacent row unit, the need for a separate driveshaft coupler can be eliminated.

An advantage of one specific embodiment of the foregoing arrangement is the ease with which individual row units can be removed for repair or replacement. If the inner sleeve of a row unit has an inner surface with a constant cross-section over its entire length, either of the two driveshafts supported in the inner sleeve can translated completely through the inner sleeve without undue difficulty. In this manner, a single row unit can be removed while the adjacent row units remain bolted in place.

Figure 5A:
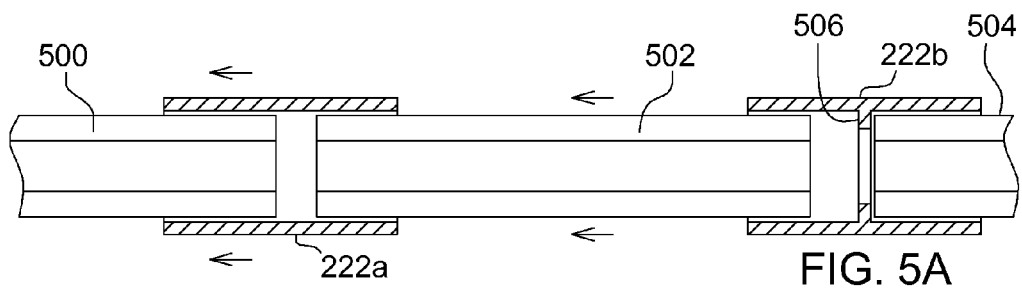
FIG. 5A-5E illustrate successive positions of two inner sleeves of two corresponding row units and a sectional driveshaft showing a method of removing the two corresponding row units, by sliding an inner sleeve of a slip clutch along a driveshaft.

This process is illustrated schematically in FIGS. 5A-5E. In FIG. 5A, a first driveshaft 500, a second driveshaft 502, and a third driveshaft 504 are shown supported in a first inner sleeve 222a of a slip clutch of one row unit (not shown), and supported in a second inner sleeve 222b of a slip clutch of an adjacent row unit (not shown). The row units and other components are not necessary for this description and therefore have been removed for clarity of illustration.

In FIG. 5A, the first inner sleeve 222a, the second inner sleeve 222b the first driveshaft 500, the second driveshaft 502, and the third driveshaft 504 are shown in their normal operating position, in which they are coaxial and rotate about a common axis of rotation, communicating power from one driveshaft to another through the inner sleeves. Note that the drive shafts are not fixed together. There is no continuous power chain extending from driveshaft to driveshaft. The inner sleeves are power conveying elements to transfer power from one driveshaft to the adjacent driveshaft inside the inner sleeves.

The first inner sleeve 222a and the second inner sleeve 222b are preferably constructed and function the same as the inner sleeves 222 shown in FIGS. 1-4. They are shown in FIGS. 5A-5E in schematic form. Some of the surface features (such as the apertures that receive the engagement elements 228) have been removed for clarity of illustration in FIGS. 5A-5E.

Furthermore, the arrangements and capabilities of the through holes of first inner sleeve 222a and second inner sleeve 222b in FIGS. 5A-5E can be applied to any of the inner sleeves 222 of FIGS. 1-4.

One end (the left end in FIGS. 5A-5E) of the first driveshaft 500 has been removed for clarity of illustration. The end that has been removed can be (although need not be) connected to another adjacent row unit. In one arrangement, that adjacent row unit may use another first inner sleeves 222 or another second inner sleeve 222b.

One end (the right end in FIGS. 5A-5E) of the third driveshaft 504 has been removed for clarity of illustration. The end that has been removed can be (although need not be) connected to another adjacent row unit. In one arrangement, that adjacent row unit may use another first inner sleeves 222 or another second inner sleeve 222b.

Figure 5B:
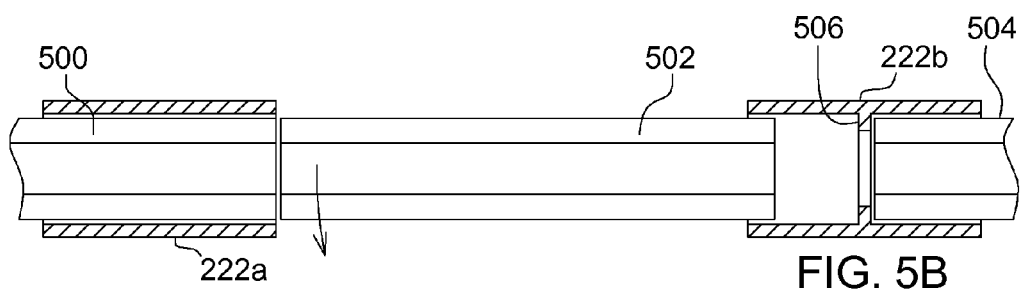

In FIG. 5B, the bolts (not shown) that fix the row unit having inner sleeve 222a to the toolbar 106 have been loosened, and the entire row unit (including the inner sleeve 222a) has been slid to the left. In this position, the previously adjacent ends of driveshaft 500 and driveshaft 502 are removed from the inner sleeve 222a. This is only possible if driveshaft 500 can be slid entirely through the inner sleeve 222a until it extends at least partially out the other side of the inner sleeve 222a.

In the position shown in FIG. 5B, the left end of driveshaft 502 is now free with respect to the inner sleeve 222a. It can be translated up and down front to back without being restrained by the inner sleeve 222a. As indicated by the arrow in FIG. 5B, the driveshaft 502 can be translated downward at its free end (its left end in FIG. 5) while remaining restrained at its other end in inner sleeve 222b.

Figure 5C:
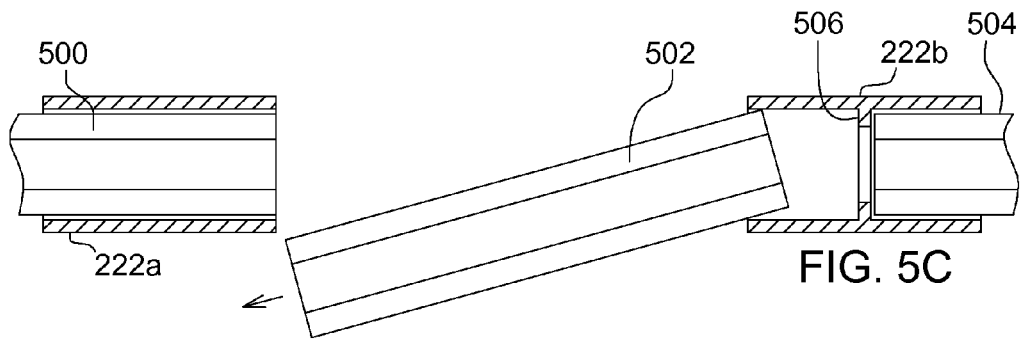

In the position shown in FIG. 5C, the free (left) end of the second driveshaft 502 is pivoted downward and away from the inner sleeve 222a while the other end of the second driveshaft 502 still remains restrained and contained within the inner sleeve 222b. In this position, there is sufficient clearance at the free end of second driveshaft 502 to permit it to be withdrawn from the inner sleeve 222b in a direction parallel to the longitudinal axis of the second driveshaft 502, which is indicated by the arrow in FIG. 5C.

Figure 5D:

In the position shown in FIG. 5D, the second driveshaft 502 is completely withdrawn from the inner sleeve 222b. In this position, with the second driveshaft 502 completely removed, the row unit having inner sleeve 222a can be translated back to the right (in FIG. 5D) along the toolbar 106 in the direction indicated by the arrows adjacent to the inner sleeve 222a.

Figure 5E:
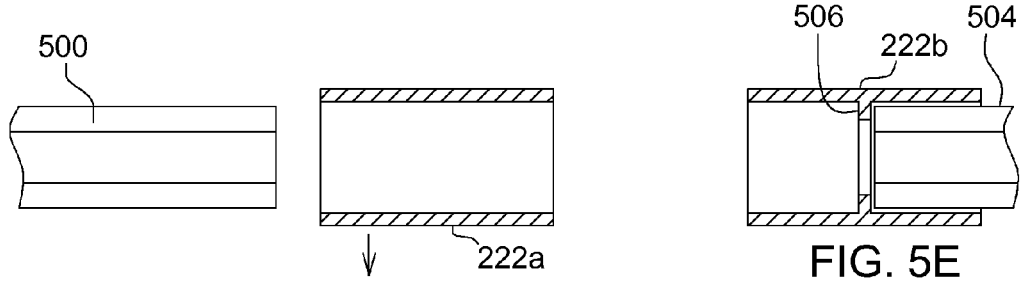

In the position shown in FIG. 5E, the row unit containing the inner sleeve 222a is translated rightward until the right end of driveshaft 500 is completely removed from the inner sleeve 222a and the row unit of which it forms a part. Now that the row unit is completely separate from the first driveshaft 500 and the second driveshaft 502, it can be lowered to the ground as indicated by the directional arrow underneath the inner sleeve 222a. Note that the first driveshaft 500 need not be a sectional driveshaft. It can extend through and drive the slip clutches of several adjacent row units and therefore not be able to pivot up or down, yet the row unit associated with the inner sleeve 222a can still be removed from the first driveshaft 500 by translating the row unit associated with inner sleeve 222a rightwardly as shown in the transition between FIG. 5D and FIG. 5E.

Note also that once the second driveshaft 502 has been removed (see FIG. 5D) the row unit having the inner sleeve 222b can be removed in the same manner as the row unit having the inner sleeve 222a by movement in the opposite (i.e. the leftward) direction.

The inner sleeve 222b includes an abutment 506 along its length that prevents either the right end of the second driveshaft 502 or the left end of third driveshaft 504 (or both of them) to pass completely through the inner sleeve 222b. This would seem to prevent the row unit associated with the inner sleeve 222b from being removed as easily as the row unit associated with the inner sleeve 222a. This is not the case. Once the second driveshaft 502 has been removed (see FIG. 5D) the row unit associated with the inner sleeve 222b can unbolted from the toolbar 106 and slid to the left until it is disconnected from the third driveshaft 504. It can then be lowered to the ground and removed entirely from the corn head 100 in the same manner as the row unit associated with the inner sleeve 222a. Similarly, the third driveshaft 504 did not be a sectional driveshaft. In fact, it need not be a sectional driveshaft, just like the first driveshaft 500 need not be a sectional driveshaft.

Having described the preferred embodiments, it will become apparent that various modifications can be made without departing from the scope of the invention as defined in the accompanying claims.

For example, any one or all of the inner sleeves 222 can have an internal bore that permits either driveshaft supported in the inner sleeve 222 to translate completely through the inner sleeve as shown in FIGS. 5A-5E.

As another example, any one or all of the inner sleeves 222 can have an abutment 506 that prevents either one or both of the driveshafts supported in an inner sleeve 222 from being removed using the process shown in FIGS. 5A-5E. While this arrangement has the disadvantage of preventing easy removal of a row unit, it nonetheless provides the benefit of not requiring a single long driveshaft extending through all (or many) of the row units that will require a tractor or truck to remove. By permitting adjacent drive shafts to be coupled within and coupled by the inner sleeve 222 of a row unit even if that row unit cannot slide back and forth on either driveshaft, this arrangement still provides the benefit of not requiring a separate, additional mechanical coupling to join the ends of two abutting driveshafts between two adjacent row units.

As another example, the inner sleeve 222 need not have an open passageway that extends completely therethrough (i.e. it need not form a through hole) the abutment 506 can be formed as a wall.

The invention claimed is:

1. A sectional driveshaft arrangement for a corn head (100), the arrangement comprising:
 a first row unit (108, 110, 112, 118, 120, 122) comprising a first gearbox (200) and a first slip clutch (214, 216) drivingly coupled to the first gearbox (200);

a first driveshaft (218, 220, 232), the first driveshaft having a first end and a second end opposite the first end, wherein the first end terminates within the first slip clutch (214, 216); and a second driveshaft (218, 220, 232), the second driveshaft having a third end and a fourth end opposite to the third end, wherein the third end terminates within the first slip clutch (214, 216);

wherein the first slip clutch (214, 216) is configured to be driven in rotation by the first driveshaft (218, 220, 232) and to drive the second driveshaft (220, 232) in rotation.

2. The sectional driveshaft arrangement for a corn head (100) of claim 1, further comprising:

a second row unit (110, 112, 114, 116, 118, 120) adjacent to the first row unit (108, 110, 112, 118, 120, 122), the second row unit comprising a second gearbox (200) and a second slip clutch (216), wherein the fourth end of the second driveshaft (220, 232) terminates within the second slip clutch, and further wherein the second slip clutch (216) is configured to be driven in rotation by the second driveshaft (220, 232).

3. The sectional driveshaft arrangement for a corn head (100) of claim 2, further comprising:

a third driveshaft (232), the third driveshaft (232) having a fifth end and having a sixth end opposite the fifth end;

wherein the fifth end terminates in the second slip clutch (216) and further wherein the second slip clutch drives the third driveshaft in rotation.

4. The sectional driveshaft arrangement for a corn head (100) of claim 3, further comprising:

a third row unit (112, 114, 116, 118) adjacent to the second row unit (110, 112, 118, 120), the third row unit comprising a third gearbox (200) and a third slip clutch, wherein the sixth end terminates in the third slip clutch, and further wherein the third slip clutch is configured to be driven in rotation by the third driveshaft (232).

5. The sectional driveshaft arrangement for a corn head (100) of claim 1, wherein at least one of the first driveshaft (218, 220, 232) and the second driveshaft (218, 220, 232) extends between and drivingly couples the first row unit (108, 110, 112, 118, 120, 122) to the second row unit (108, 110, 112, 118, 120, 122).

6. The sectional driveshaft arrangement for a corn head (100) of claim 1, wherein the first end of the first driveshaft (218, 220, 232) is polygonal in cross-section and is supported in and drivingly engaged to a polygonal aperture in the first slip clutch (214, 216).

7. The sectional driveshaft arrangement for a corn head (100) of claim 1, wherein the first row unit (108, 110, 112, 118, 120, 122) further comprises a first gearbox (200), two arms (202, 204) fixed to the gearbox and extending forwardly therefrom, and two gathering chains (206) supported on the arms (202, 204).

8. A sectional driveshaft arrangement for a corn head (100), the arrangement comprising:

a first row unit (108, 110, 112, 118, 120, 122) comprising a first gearbox (200) and a first slip clutch (214, 216) drivingly coupled to the first gearbox (200);

a first driveshaft (218, 220, 232), the first driveshaft having a first end and a second end opposite the first end, wherein the first end terminates within the first slip clutch (214, 216); and a second driveshaft (218, 220, 232), the second driveshaft having a third end and a fourth end opposite to the third end, wherein the third end terminates within the first slip clutch (214, 216);

wherein the first slip clutch (214, 216) is configured to be driven in rotation by the first driveshaft (218, 220, 232) and to drive the second driveshaft (220, 232) in rotation, and further wherein the first slip clutch (214, 216) comprises an inner sleeve (222) that receives and supports the first end and the third end, and further wherein the inner sleeve (222) transmits power from the first end to the third end.

9. The sectional driveshaft arrangement for a corn head (100) of claim 8, wherein the inner sleeve (222) has a through hole with an inner surface that, in axial cross-section, defines a first polygon, and further wherein the first end and the third end have outer surfaces that, in axial cross-section, define a second polygon, and further in which the second polygon can be disposed within the boundaries of the first polygon, and further in which the second polygon is not capable of being rotated with respect to the first polygon while staying within the boundaries of the first polygon.

10. The sectional driveshaft arrangement for a corn head (100) of claim 8, wherein the first end is configured to be received in a first side of the inner sleeve (222) and to axially translate through the inner sleeve (222) until the first end passes entirely through the inner sleeve (222) and extends at least partially out a second side of the inner sleeve (222).

11. The sectional driveshaft arrangement for a corn head (100) of claim 10, wherein the third end is configured to be received in the second side of the inner sleeve (222) and to axially translate with respect to the inner sleeve (222) until the third end passes entirely through the inner sleeve (222) and extends at least partially out the first side of the inner sleeve (222).

12. The sectional driveshaft arrangement for a corn head (100) of claim 9, wherein the first polygon and the second polygon are regular polygons.

13. The sectional driveshaft arrangement for a corn head (100) of claim 9, wherein the first polygon and the second polygon are hexagons.

14. A sectional driveshaft arrangement for a corn head (100), the arrangement comprising:

a first row unit (108, 110, 112, 118, 120, 122) comprising a first gearbox (200) and a first slip clutch (214, 216) drivingly coupled to the first gearbox (200);

a first driveshaft (218, 220, 232), the first driveshaft having a first end and a second end opposite the first end, wherein the first end terminates within the first slip clutch (214, 216); and a second driveshaft (218, 220, 232), the second driveshaft having a third end and a fourth end opposite to the third end, wherein the third end terminates within the first slip clutch (214, 216);

wherein the first slip clutch (214, 216) is configured to be driven in rotation by the first driveshaft (218, 220, 232) and to drive the second driveshaft (220, 232) in rotation, and further wherein the first slip clutch has an abutment (506) disposed to prevent the first end or the third end from passing completely through the first slip clutch.

15. A sectional driveshaft arrangement for a corn head (100), the arrangement comprising:

a first row unit (108, 110, 112, 118, 120, 122) comprising a first gearbox (200) and a first slip clutch (214, 216) drivingly coupled to the first gearbox (200);

a first driveshaft (218, 220, 232), the first driveshaft having a first end and a second end opposite the first end, wherein the first end terminates within the first slip clutch (214, 216); and a second driveshaft (218, 220, 232), the second driveshaft having a third end and a fourth end opposite to the third end, wherein the third end terminates within the first slip clutch (214, 216);

wherein the first slip clutch (214, 216) is configured to be driven in rotation by the first driveshaft (218, 220, 232) and to drive the second driveshaft (220, 232) in rotation, and further wherein the first slip clutch defines a first aperture extending into the first slip clutch from one side of the first slip clutch, and wherein the first slip clutch defines a second aperture extending into the first slip clutch from a side of the first slip clutch that is opposite the one side, and wherein the first end is inserted into the first aperture, and the second end is inserted into the second aperture.

16. The sectional driveshaft arrangement for a corn head (100) of claim 15, wherein the first and has a first rotational axis and the second end has a second rotational axis, and further wherein the first rotational axis and the second rotational axis are coaxial.

\* \* \* \* \*